(12) United States Patent
Gagnon

(10) Patent No.: US 7,072,679 B2
(45) Date of Patent: Jul. 4, 2006

(54) AUTOMATIC TRANSMIT POWER CONTROL DISABLING

(75) Inventor: Marc Gagnon, Deux Montagnes (CA)

(73) Assignee: Harris Corporation, Melbourne, FL (US)

( * ) Notice: Subject to any disclaimer, the term of this patent is extended or adjusted under 35 U.S.C. 154(b) by 235 days.

(21) Appl. No.: 10/183,365

(22) Filed: Jun. 28, 2002

(65) Prior Publication Data

US 2004/0203986 A1  Oct. 14, 2004

(51) Int. Cl.
*H04B 7/00* (2006.01)
*H04Q 7/20* (2006.01)

(52) U.S. Cl. ............... 455/522; 455/69; 455/127.1; 455/561

(58) Field of Classification Search ........... 455/522, 455/69, 127.1, 127.2, 67.11, 561, 562.1, 277.1, 455/446, 447, 68, 560, 453, 127.5; 370/332, 370/337, 329, 338, 349, 410
See application file for complete search history.

(56) References Cited

U.S. PATENT DOCUMENTS

| 5,357,513 | A | * | 10/1994 | Kay et al. ................. 455/522 |
| 5,392,459 | A | * | 2/1995 | Baba et al. ................ 455/69 |
| 5,596,333 | A | * | 1/1997 | Bruckert ................... 455/522 |
| 6,643,519 | B1 | * | 11/2003 | Lundgren .................. 455/505 |
| 2003/0054850 | A1 | * | 3/2003 | Masseroni et al. ......... 455/522 |

\* cited by examiner

*Primary Examiner*—Nay Maung
*Assistant Examiner*—John J. Lee
(74) *Attorney, Agent, or Firm*—Duane Morris LLP

(57) ABSTRACT

A communications system in which a plurality of transmitter and receiver stations, wherein the transmitter stations are co-located in the same geographic area and capable of communication with each other and an improved method of Automatic Transmitter Power Control (ATPC) operation, wherein the method allows only one transmitter to engage in ATPC at a time per channel set and another improved method of ATPC in which there exists at least two co-located transmitters capable of ATPC operation and wherein the transmitters share transmitter ATPC status.

18 Claims, 3 Drawing Sheets

AUTOMATIC TRANSMIT POWER CONTROL DISABLING

BACKGROUND OF THE INVENTION

Automatic Transmitter Power Control (ATPC) is used to reduce the digital to digital distant interference between hops that re-use the same frequency and facilitate the sharing of bandwidth with GSO service. The transmitter power amplifier output level is driven from a proper minimum which is calculated to facilitate the radio network planning which is used in the case of normal propagation, up to a maximum value which is used when the channel is faded and degrades, i.e. the receive level is lower than the targeted level or errors are detected at the far end.

The ATPC function allows the system to adjust its transmitter output power to a level which suits the far end Received Signal Level (RSL) and Received Bit Error Rate (RBER) targeted objectives as determined by the user and within the ATPC range potential. When engaged, the ATPC mechanism is continuously adjusting the output power of the local transmitter based on the remote RSL reporting or boosting the power on the presence of remote channel degradation.

In current communication system that have co-located transmitters, ATPC can interfere or be interfered with, on and by neighboring receivers that are using adjacent or semi-adjacent RF channels which can cause an erratic ATPC operation. The ATPC may continuously oscillate between engaged and disengaged because of neighboring interference is introducing a channel condition variation triggering one or more of the ATPC triggering mechanism criteria, i.e. RSL or RBER not within proper range.

The subject matter of the present application uses the ability of neighboring systems of the same system family to communicate with each other to prevent undesired ATPC related effects when the ATPC feature is used.

SUMMARY OF THE INVENTION

An object of the invention is an improved method of automatic transmitter power control operation in a communication system with a plurality of transmitter stations and a plurality of receiver stations, where the transmitter stations co-located in the same geographic area and capable of communication with one another. The improvement allowing only one of the receivers to request ATPC correction at a time.

Another object of the invention is an improved method of ATPC operation in a communication system with a plurality of co-located transmitters and capable of communication with one another. The improvement allowing only one transmitter to engage in ATPC at a time per channel set.

Yet another object of the invention is an improved method of ATPC operation in a communication system with at least two co-located transmitters capable of Automatic Transmitter Power Control (ATPC) operation. The improvement being sharing transmitter ATPC status between the at least two transmitters.

These and many other objects and advantages of the present invention will be readily apparent to one skilled in the art to which the invention pertains from a perusal of the claims, the appended drawings, and the following detailed description.

DETAILED DESCRIPTION OF THE INVENTION

Automatic Transmit Power Control is a system feature that allows transmitters to work at a low transmission power most of the time. When more power is required, the transmit power is automatically increased in proportion to the loss of RSL at the receiver or as a step if there are errors in the received signal with no RSL Correction requirements.

Figure 1:
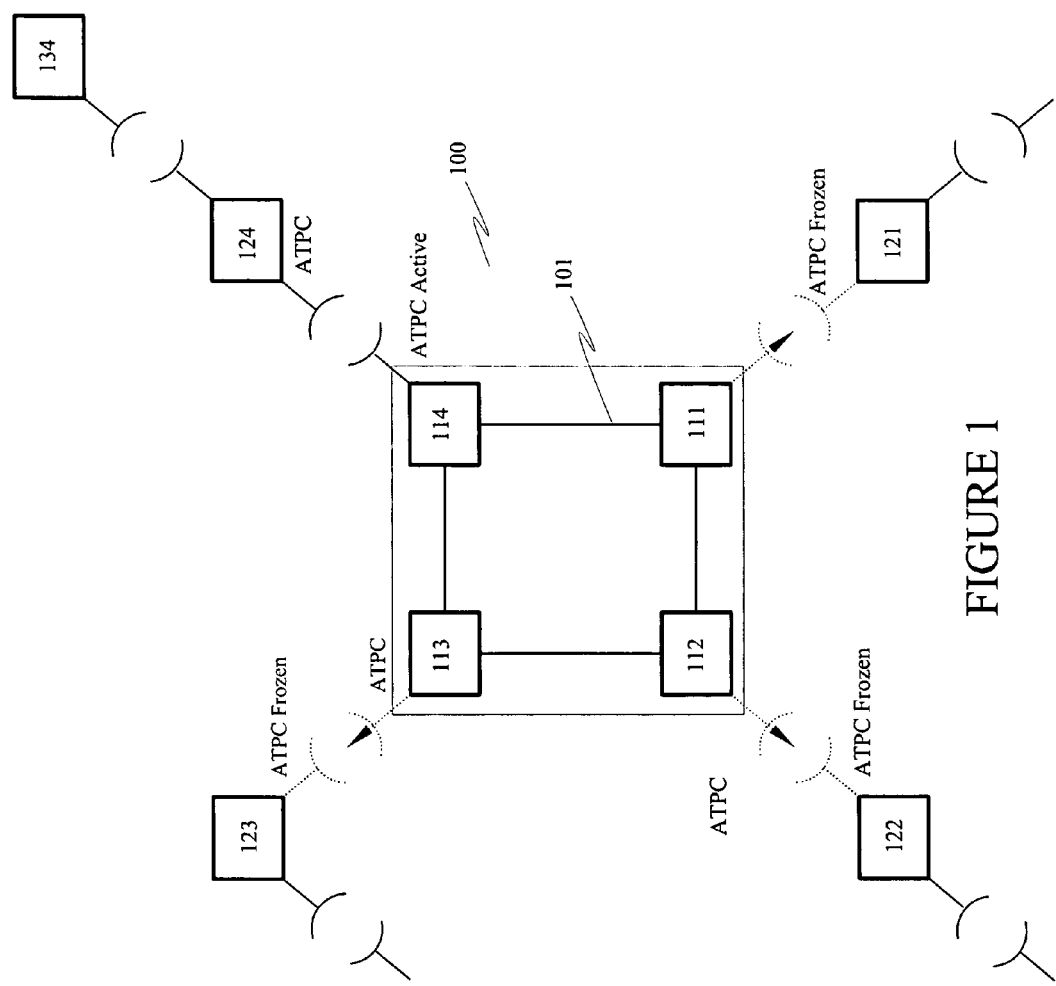
FIG. 1 is a representation of an embodiment of a communication system of the present invention.

FIG. 1 shows a community of co-located transmitters 100 that communicate with each other over a network 101. The network can be hard-wired, a system of RF links or other suitable network arrangement. Each transmitter 111, 112, 113 and 114 are capable of engaging in ATPC with their associated receivers designated as 121, 122, 123 and 124 respectively in FIG. 1. The amount of receivers is not limited to those shown in FIG. 1, and in practice a plurality of receivers can be associated with each transmitter. Likewise the number of transmitters is not limited.

The transmitters 111–114 communicate with receivers over an air link of RF, IR or other wireless medium.

The community of co-located transmitters 100 is defined by the geographic proximity of the member transmitter. As interference is greatly influenced by proximity, especially in a network in which frequency reuse is employed. Those transmitters proximate to other transmitters within a communication system to a degree that interference becomes a significant problem are included as neighboring transmitters within the community. In FIG. 1, transmitters 111, 112 and 113 are neighboring transmitters to transmitter 114. Likewise transmitter 114 is a neighboring transmitter to transmitters 111, 112 and 113.

The networked transmitters of FIG. 1 are configured by the operator such that only one of the links is allowed the use of the ATPC feature in the network neighborhood. Each transmitter or receiver associated with the community of co-located transmitters 100 include an ATPC Disabling Mechanism (ATPC-DM) that may be selectively set at active or inactive. In the inactive state the transmitter can engage in ATPC regardless of the status of its neighboring transmitters. Transmitters with its ATPC-DM set as active are limited in their ATPC operation depending on the ATPC status of its neighboring transmitters.

The transmitters' ATPC functions when the ATPC-DM is active are limited as to channel sets. The channel sets include co-channels, adjacent channels and semi-adjacent channels. The channel sets include those proximate channels most likely to result in interference or confusion during ATPC operations. Where the transmitters in the networked community 100 are capable of communication over numerous channels, they may be prohibited from engaging in ATPC functions for one channel set while enable to engage in ATPC functions for a different channel set.

In FIG. 1, transmitter 114 is engaged in ATPC with receiver 124 in a channel set. The other neighboring transmitters 111, 112 and 113 are prohibited from engaging in ATPC on channels within the respective channel set.

Figure 2:
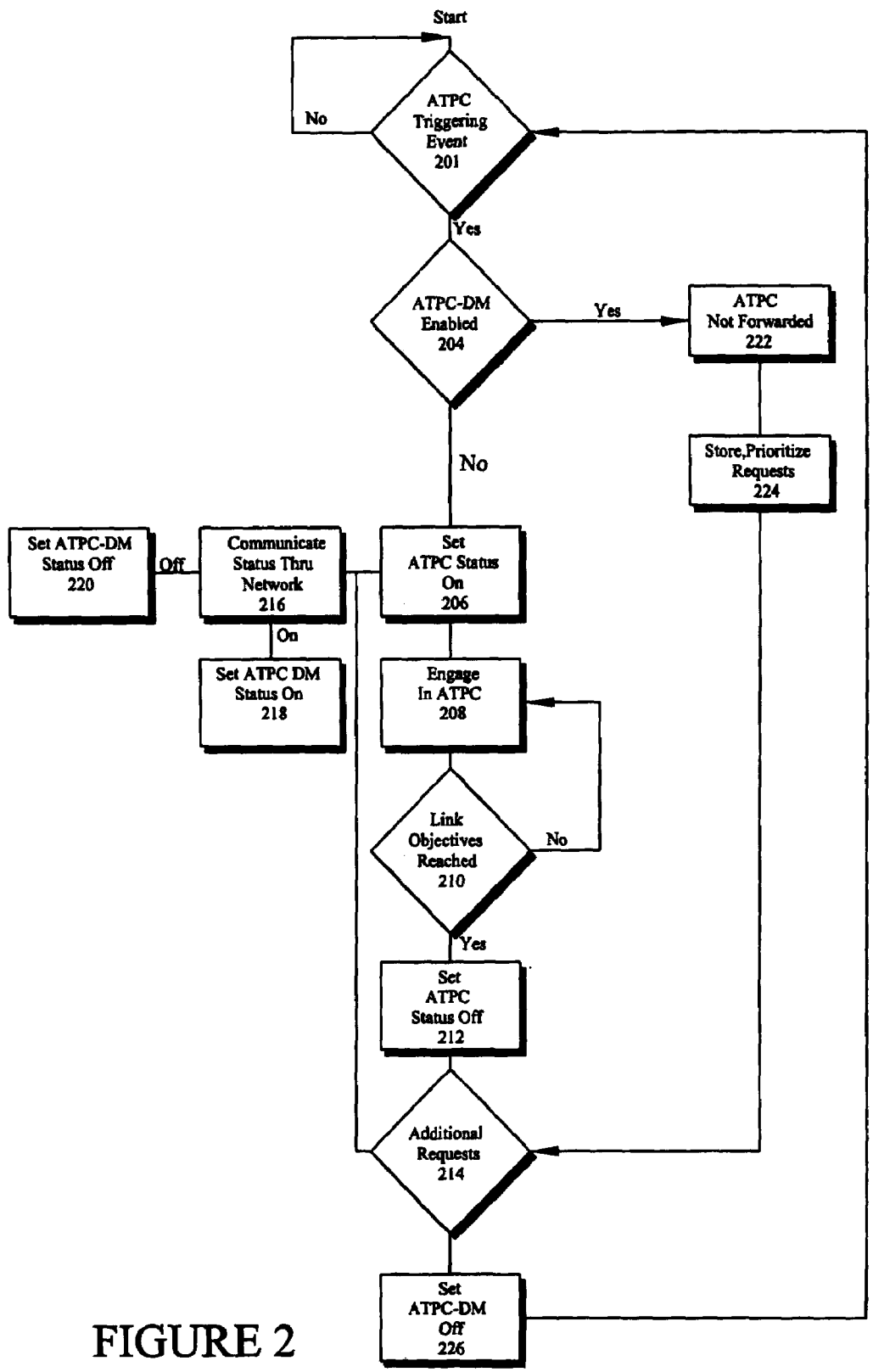
FIG. 2 is a representative flow chart of an embodiment of the present invention.

The process of transmitter 114 engaging in ATPC is shown in FIG. 2. The process starts with an ATPC triggering event in block 201. Triggering events can include the RSL of RBER of a link falling below their respective targets. The respective targets may be configurable by a user or standardized.

The link receiver 124 in which the ATPC triggering event has occurred, determines in block 204 whether its ATPC-DM is enabled ("on" or "Frozen"). Each of the receivers associated with the co-located transmitters may include an ATPC-DM. The enabled state of the ATPC-DM is separate from the active/inactive states, in that only when in the active state can the ATPC-DM be enabled. Furthermore, when the ATPC-DM is inactive the enable/disable states are inconsequential. If the ATPC-DM is enabled, ATPC is frozen, indicating another link is undergoing ATPC correction, the request is not forwarded and may be saved as in block 224 for future action. An enabled ATPC-DM prevents the receiver from initiating a request or results in the transmitter ignoring the respective request.

If the ATPC-DM is disabled ("off" or "unfrozen"), the link proceeds into ATPC correction as in Block 208, proceeded by setting its ATPC status as engaged ("on"). The ATPC status is an indication of whether the particular link is engaged in ATPC functions. The ATPC status of the link is communicated by a network to other receivers in the communication community as show in Block 216. The receipt of an ATPC status "on" results in the ATPC-DM being set at "on" for all other receivers in block 218.

The respective link remains in ATPC correction until the link objective have been reached, specifically RSL or RBER in block 210. In addition ATPC correction may also be terminated in response to other parameter such as power has exceeded a maximum value or ATPC has timed out in accordance with regulations.

Upon ending ATPC correction the receiver sets is ATPC status to "off" in Block 212. As the system allows only one receiver to engage in ATPC operation at a time, it is likely that a backlog of triggering events in other links have occurred. In such a case it is preferred that upon termination, those requests are addressed in a prioritized manner. In Block 224 subsequent requests are prioritized and stored. In Block 214 the stored request are retrieved, their ATPC-DM is set at "off" and they are allowed to enter ATPC correction if their triggering event is still valid at Block 206. The priority of the stored request can be a first come, first serve basis, or by other considerations based on link importance, communication duration or degree of link degradation.

If there are no stored request or the triggering events of the store requests are no longer valid, the ATPC status of the receiver is communicated to the other receivers, the ATPC-DM of all the receivers is set to off. Thus, enabling all the receivers an opportunity to enter into ATPC correction.

Figure 3:
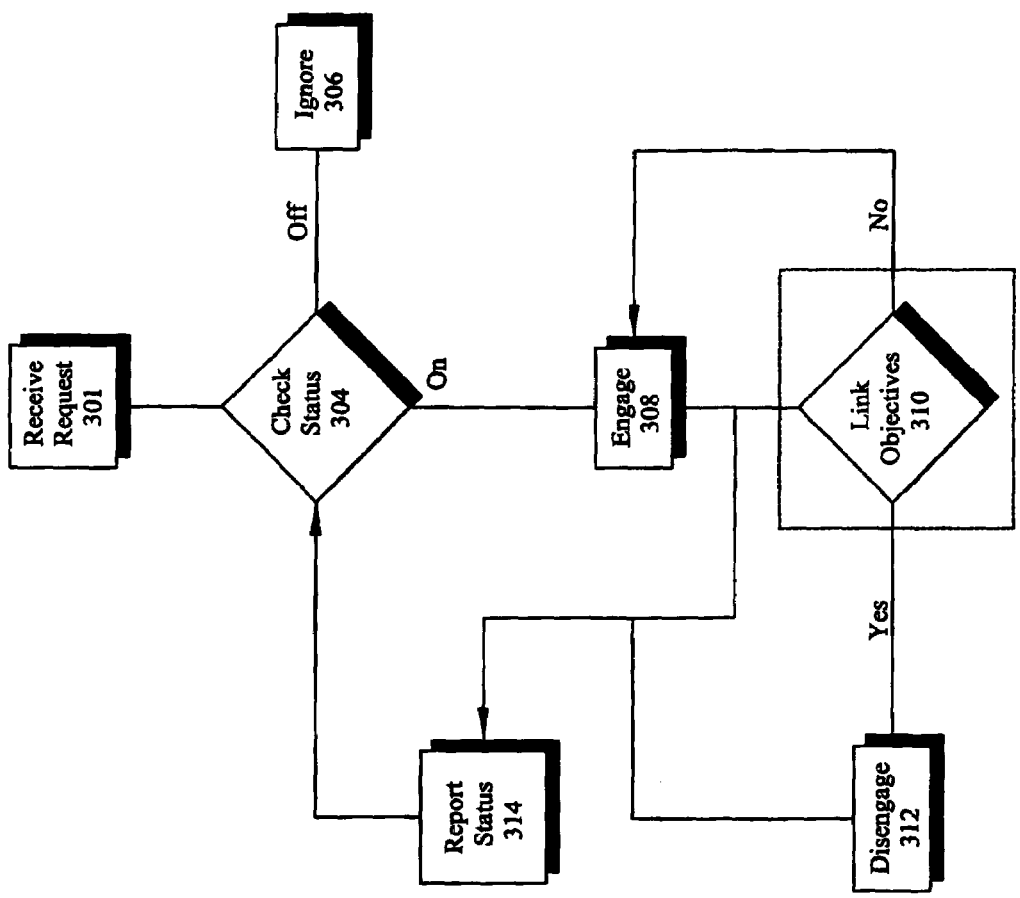
FIG. 3 is a representative flow chart of an embodiment of the present invention.

Whereas the first embodiment of ATPC disabling is receiver oriented, another embodiment of the ATPC operation is transmitter oriented as described in FIG. 3. Transmitter 114 receives a request for ATPC correction from receiver 124 associated with a channel set in Block 301. The Transmitter checks the ATPC status of the other co-located transmitters in the community per respective channel set in Block 304. If no other transmitter is in ATPC operation for the respective channel set, transmitter 114 is allowed to proceed into ATPC operation. Upon engaging in ATPC at block 308, the transmitter 114 sends a ATPC status notification at Block 314 to the other neighboring transmitter indicating that it is engaged in ATPC and thus prohibiting the neighboring transmitter in entering ATPC for that channel set. After reaching the link objective at block 310, the transmitter 114 disengages from ATPC operation at block 312 and sends an ATPC status notification to the other transmitters indicating it is not in ATPC operation for the respective channel set. The other transceivers thus have an opportunity to engage in ATPC operation for the respective channel set.

While transmitter 114 is engaged in ATPC operation, another transmitter, such as transmitter 113, receives an ATPC request from receiver 123, transmitter 113 likewise would check the status of the other transmitters regarding the particular channel set. If the channel set that transmitter 114 is in ATPC operation over is the same channel set, transmitter 113 would ignore, or deny the request from receiver 123. However, if the channel sets were different, transmitter 113 would be allowed to continue the process as described above for transmitter 114.

The manner in which ATPC status notifications are distributed over the network can be in many forms. A commonly accessible database, a control signal, or simple logic circuits are but a few methods in which the other transmitters could access the ATPC status of their neighbors. Methods of prompting, periodic reporting or event driven ATPC status notification are all envisioned to be used with the above described ATPC disabling operation.

The transmitters and receivers described above can be equally capable of engaging in receiving and transmitting respectively and require at least a measure of such capability to engage in ATPC operation as described above.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. The present invention is not intended to be limited to the embodiments shown herein but is to be accorded the widest scope consistent with the principles and novel features disclosed herein.

What is claimed is:

1. A method of communicating between plural transmitter stations and plural receiver stations, the method comprising the steps of:

providing plural transmitter stations co-located in the same geographic area and capable of communication with one another;

providing plural receiver stations;

providing Automatic Transmitter Power Control for each of said plural transmitter stations; and engaging in Automatic Transmitter Power Control with one of said plural receivers and preventing others of said plural receivers from making a Automatic Transmitter Power Control request for Automatic Transmitter Power Control correction while engaged in Automatic Transmitter Power Control with the one of said plural receivers.

2. The method of claim 1, wherein the Automatic Transmitter Power Control request is based on Automatic Transmitter Power Control triggering criteria.

3. The method of claim 2, wherein the triggering criteria includes received bit error rate and received signal level.

4. The method of claim 1, wherein the plurality of receiver stations are on adjacent or semi-adjacent RF channels.

5. The method of claim 4, including the steps of: a requesting receiver station associated with one of the transmitters prompting the other transmitter stations to freeze requests for Automatic Transmitter Power Control correction for all of the other receiving stations.

6. The method of claim 5, including the step of releasing the freeze when the link of the receiver station requesting Automatic Transmitter Power Control correction has reached its link objective.

7. The method of claim 6, wherein the link objectives include received bit error rate and received signal level.

8. The method of claim 6, wherein the step of releasing the freezing is performed via network connections.

9. The method of claim 6, wherein the step of releasing the freezing is performed via a RF channel.

10. The method of claim 5, wherein prompting the other transmitter stations is performed via network connections.

11. The method of claim 5, wherein prompting the other transmitter stations is performed via a RF channel.

12. The method of claim 1, wherein the selection of the one receiver station allowed to request Automatic Transmitter Power Control correction is based on a set of criteria.

13. The method of claim 12, wherein the criteria is first come, first served.

14. The method of claim 12, wherein the criteria is based on link characteristics.

15. A method of transmitting from plural transmitter stations on one or more channel sets, the method comprising the steps of:

providing plural transmitter stations co-located in the same geographic area and capable of communication with one another;

providing Automatic Transmitter Power Control for each of said plural transmitter stations; and engaging in Automatic Transmitter Power Control with one of said plural transmitter stations on a channel set and during the engagement preventing others of said plural transmitter stations from engaging in Automatic Transmitter Power Control on the same channel set.

16. The method of claim 15, wherein the channel sets include adjacent and semi adjacent RF channels.

17. The method of claim 16, wherein the co located transmitters communicate Automatic Transmitter Power Control information with one another.

18. The method of claim 17, wherein while one of the co-located transmitters is engaged in Automatic Transmitter Power Control operation, the other transmitters disable their respective Automatic Transmitter Power Control.

* * * * *